United States Patent [19]

McGlinsky et al.

[11] Patent Number: 4,484,843
[45] Date of Patent: Nov. 27, 1984

[54] PNEUMATIC CONVEYING SCRAP PAPER SALVAGE SYSTEM

[75] Inventors: Robert G. McGlinsky; Steve Allyn, both of Mound; James R. Whittenberg, Fridley, all of Minn.

[73] Assignee: Contamination Control Corp., Maple Plain, Minn.

[21] Appl. No.: 401,965

[22] Filed: Jul. 26, 1982

[51] Int. Cl.³ ............................................. B65G 53/60
[52] U.S. Cl. .................................... 406/170; 55/344; 55/419
[58] Field of Search ............... 406/156, 163, 168, 169, 406/170, 171, 172, 175; 55/418, 419, 344, 462

[56] References Cited

U.S. PATENT DOCUMENTS

| | | | |
|---|---|---|---|
| 979,184 | 12/1910 | Matthiessen | 406/170 |
| 3,612,616 | 10/1971 | Stewart | 406/172 |
| 3,829,165 | 8/1974 | Boon | 406/171 |
| 4,227,903 | 10/1980 | Gustavsson et al. | 55/418 X |

FOREIGN PATENT DOCUMENTS

| | | | |
|---|---|---|---|
| 2526540 | 12/1976 | Fed. Rep. of Germany | 406/168 |
| 169280 | 11/1959 | Sweden | 406/163 |

Primary Examiner—Jeffrey V. Nase
Attorney, Agent, or Firm—Jacobson & Johnson

[57] ABSTRACT

Ribbons of scrap paper are pneumatically conveyed through a conduit into an enlarged chamber where the air velocity is reduced and the paper deflected downward to a hopper at the bottom of the chamber where it is gathered and baled for reclamation. The conveying air is filtered to remove dust and is then reused. Multiple conduits for carrying contaminated and uncontaminated paper scraps can be coupled to a chamber which is sectioned by a perforated divider which keeps the paper separated but allows the air pressure to be the same in the sections. A switch at the chamber input may also be provided to selectively feed the output from the multiple conduits into one or separate sections of the chamber.

5 Claims, 6 Drawing Figures

PNEUMATIC CONVEYING SCRAP PAPER SALVAGE SYSTEM

FIELD OF THE INVENTION

This invention is for use in salvaging paper scraps with a minimum amount of dust or other harmful contaminants which might otherwise arise in the paper salvaging operation. In particular, the invention is directed for use in the magazine and/or book printing and binding trade or industry where paper pages are printed and assembled and cut or trimmed to size. The trimmed-off ribbon-like paper scraps constitute the scrap paper which is to be reclaimed. Some of the scraps may contain adhesive or other contaminants. For reclamation purposes, it has been found preferable to salvage contaminated scraps separated from uncontaminated scraps so they are separately conveyed and bundled.

DESCRIPTION OF THE PRIOR ART

Pneumatic conveying has been used for a number of years to transport scraps of paper from the trimming location in a magazine or book assembly line to chambers where they generally are fed into gathering hoppers and then into balers for eventual transportation for reclamation. In the past, the paper scraps were pneumatically carried from the trimming location by conduits and into chambers called cyclones, having cylindrical or cone-shaped walls with openings at the top and bottom. The chambers were constructed to give a cyclone effect to the air so that when the air carrying the scraps enters the chamber, it would be directed to spin and twist like a cyclone developing a low or zero pressure area at the center so that the paper would then fall to the bottom of the chamber into a hopper located underneath and the air would exit through the top opening. A number of problems are encountered with the cyclone system. For one, it requires a high energy source in order to provide the air velocities necessary to operate the system. Another is the difficulty with which the air must be filtered if it is to be reused. Ordinarily, in a cyclone system the air is not filtered and is exhausted to the atmosphere so a great deal of dust collects around the unit. Also, it has been found that if an access door is opened in the hopper at the bottom of the chamber while the system is in operation (which is sometimes necessary), it will generally create havoc causing the paper scraps and dust to swirl around and blow out of the hopper. Further, the cyclone chambers are generally of such large dimensions that they normally cannot be installed inside a factory building and so create an unsightly scene on the outside, usually on the roof of a building. This also requires additional lengths of conduit to reach the cyclone chamber from the inside of the building. Because the chambers are generally located on the outside, they are subject to environmental conditions which may affect the efficiency and reliability of operation.

SUMMARY OF THE INVENTION

In this invention the scraps of paper are conveyed through a conduit by air from their origin, such as the trimming station of a magazine or book assembly line, into a chamber which is dimensioned and arranged so that the air loses its velocity sufficiently to allow the paper scraps to fall downward into a gathering hopper which feeds a baler or the like while the air is filtered and passed out into the surrounding area. A deflection screen is located in the chamber so that the incoming air and some of the paper scraps strike it and the scraps are deflected downward to the hopper. As a feature, the upper part of the deflector screen is angled to direct the air downward onto the screen so that it blows or washes over the surface of the screen to remove any scraps of paper which might otherwise tend to adhere to the screen. The interior of the chamber is virtually at atmospheric pressure so that the scraps of paper fall freely downward. If it becomes necessary to open an access door to the hopper for any reason while the unit is operating, the operation is not disturbed. After the paper scraps have been separated from the air, the air is filtered in a conventional fashion through self-cleaning filter units and then expelled to the surrounding area. The size and the energy requirements of this system are such that the device can be installed entirely inside a factory building and the filtered air can be released within the confines of the building without harmful effects. Because no cyclonic effect is needed to remove the paper and dust from the air, it has been found that a system incorporating the instant invention can operate on approximately 50% of the required horsepower of a cyclone system.

As a further feature, the system can be constructed and operated so that contaminated and uncontaminated paper can be separately conveyed into a chamber which has a perforated divider to keep the papers separated yet permitting the air to be combined after the paper has been removed. The contaminated and uncontaminated paper scraps are fed into hoppers while the air output can be processed through a common filter system.

As yet another feature in a system where two conduits are used feeding into a divided chamber, as mentioned just previous, a switch may be provided at the chamber input so that the paper carried in both conduits can be directed to feed into one section of the chamber, if desired. This provides additional flexibility for the system so that should one part of the system be shut down for maintenance, the paper scraps will still be carried away and it is not necessary to shut down the assembly line. These and other features and advantages of this invention will be described and become apparent from the following more detailed description.

DESCRIPTION OF THE PREFERRED EMBODIMENTS

Typically, in the printing and binding of magazines, the assembled pages and/or covers have to be trimmed to size. The ribbon-like scraps of paper produced by the trimming operation have to be removed from the trimming location to keep them from interfering with the efficient operation of the system. Also, the trimming operation can produce a lot of dust. Further, it has been found that the paper scraps can be reclaimed for reuse. Some of the scraps may be contaminated with adhesive, depending upon what edge they are removed from and by the depth of the trim. Air has been used for some time as the medium for conveying away the trimmed-off scraps of paper and the accompanying dust. Typically, the pneumatic conveying system has a suitably sized conduit having an inlet located at the trimming station and an air source such as a blower located downstream to create a negative pressure in the conduit and draw the scraps of paper and dust down the conduit. At the other end, the conduit opens into a chamber where the scraps of paper are separated from the air and collected and, preferably, the dust is removed from the air after it leaves the chamber but before it is allowed to exit to the atmosphere.

Figure 1:
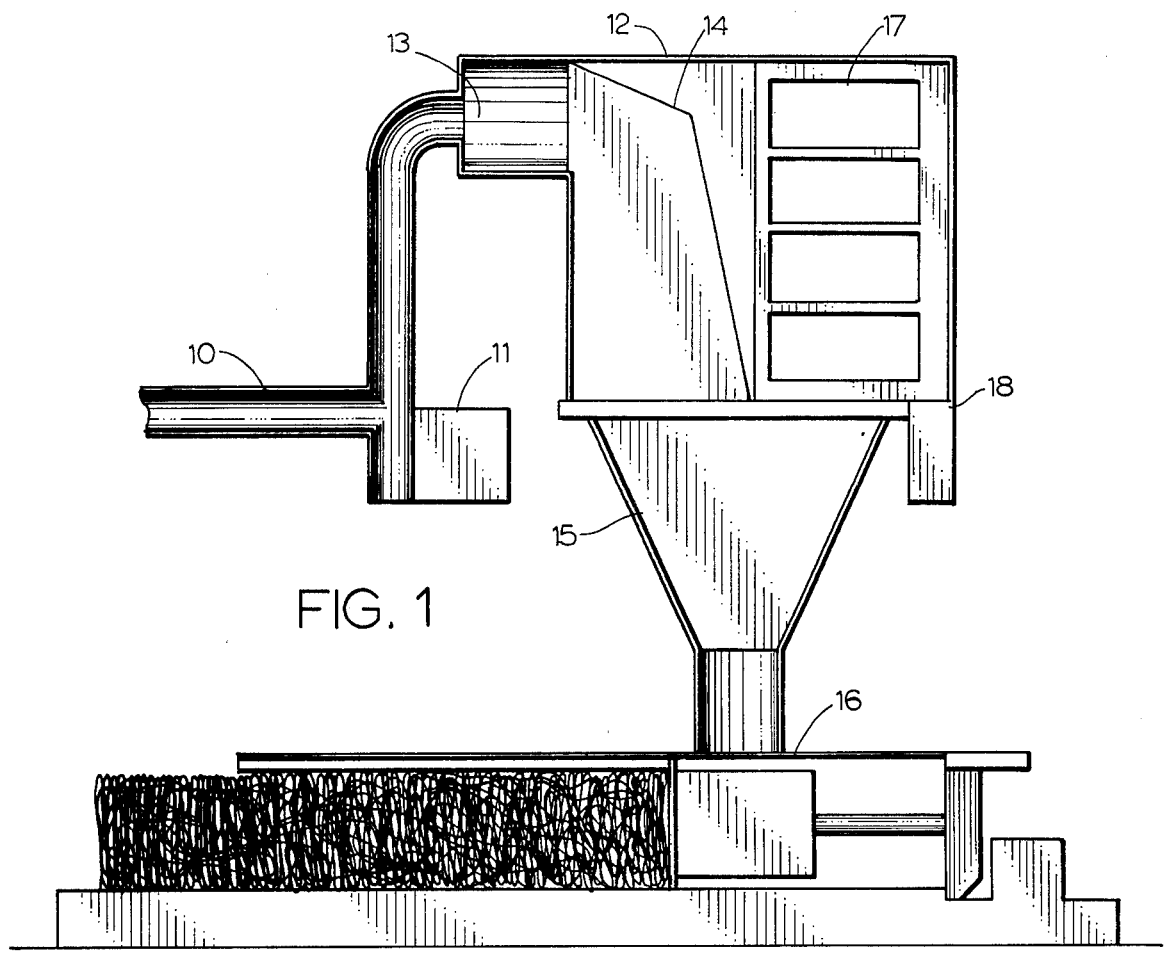
FIG. 1 is a somewhat schematic illustration of an embodiment of the invention.

A cyclone type pneumatic system for reclaiming waste scrap paper is described briefly hereinabove. A system utilizing the teachings of this invention is, in part, somewhat similar. As illustrated schematically in FIG. 1, it includes conduit means 10 having an inlet (not shown) generally located at the trimming station in an assembly line for a magazine or the like, a blower 11 located downstream from the inlet to provide the necessary air flow, and a relatively large substantially enclosed chamber 12 having an input opening 13 coupled to the outlet opening of the conduit 10. Generally, at the opening 13 the chamber 12 is somewhat enlarged so that the velocity of the input air is reduced. Inside the chamber is a deflector 14 angled rearward and downward and a hopper 15 is located underneath the chamber 12 in communication with the interior of the chamber through an opening in the bottom of the chamber (not shown). The hopper feeds a baler 16. Also, within the main housing which encloses chamber 12 located rearward from the deflector 14 is a set of filters 17. A second blower 18 in communication with the interior of the chamber 12 draws the air out of the chamber through the filters and feeds it through an outlet conduit either into the atmosphere or elsewhere.

The arrangement of the blowers with the input conduit and with the outlet from the chamber to provide the necessary air travel is not considered a part of the invention. This arrangement is commonplace and is a matter of choice and any person of any ordinary skill in the pneumatic conveying art can readily arrange these devices in a suitable fashion to provide the desired function. Similarly, various dust filtering or collection units are commercially available and can be selected by one of ordinary skill in the pneumatic conveying art as needed to fill the system requirements.

Figure 2:
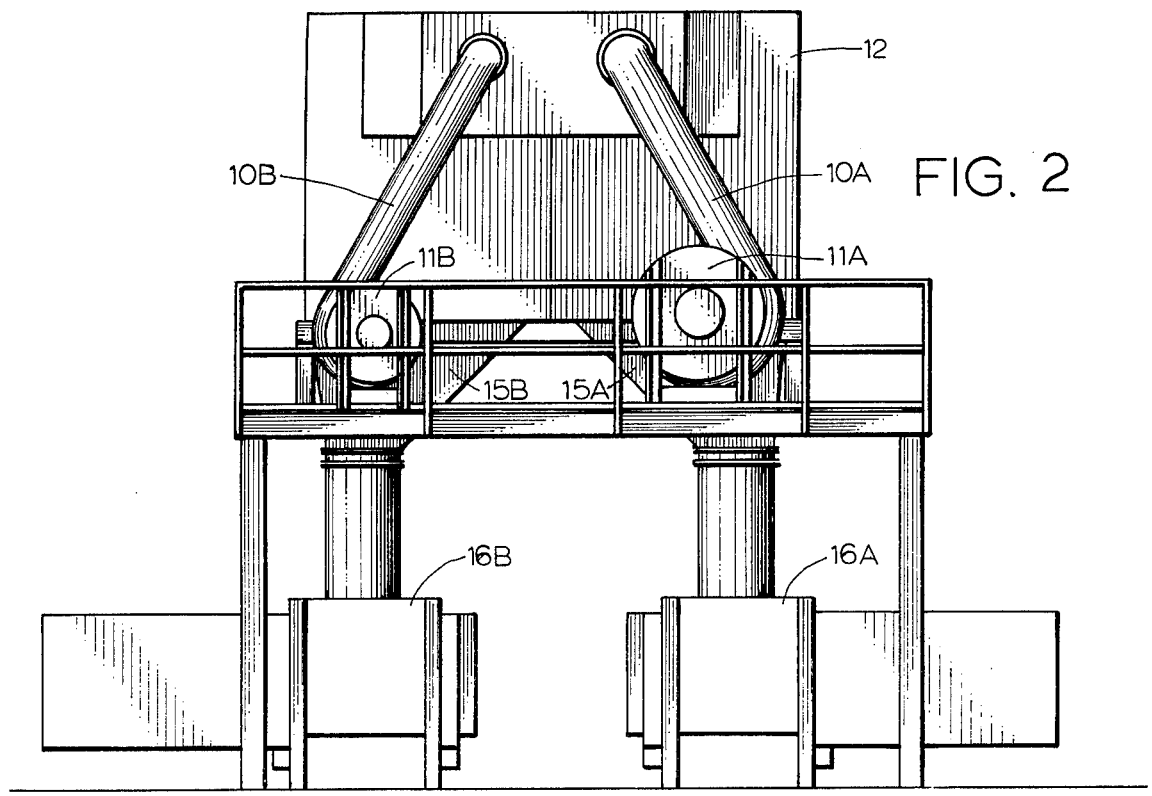
FIG. 2 is a general plan view of a typical installation utilizing two pneumatic conveyors constituting a preferred embodiment of the invention.

FIG. 2 is a plan view illustrating an arrangement of equipment according to the teachings of this invention. This embodiment has two separate conduits 10A and 10B served by their associated blowers 11A and 11B feeding into a sectioned chamber 12, each section having a respective hopper 15A and 15B feeding into a separate baler 16A and 16B for each.

Figure 3:
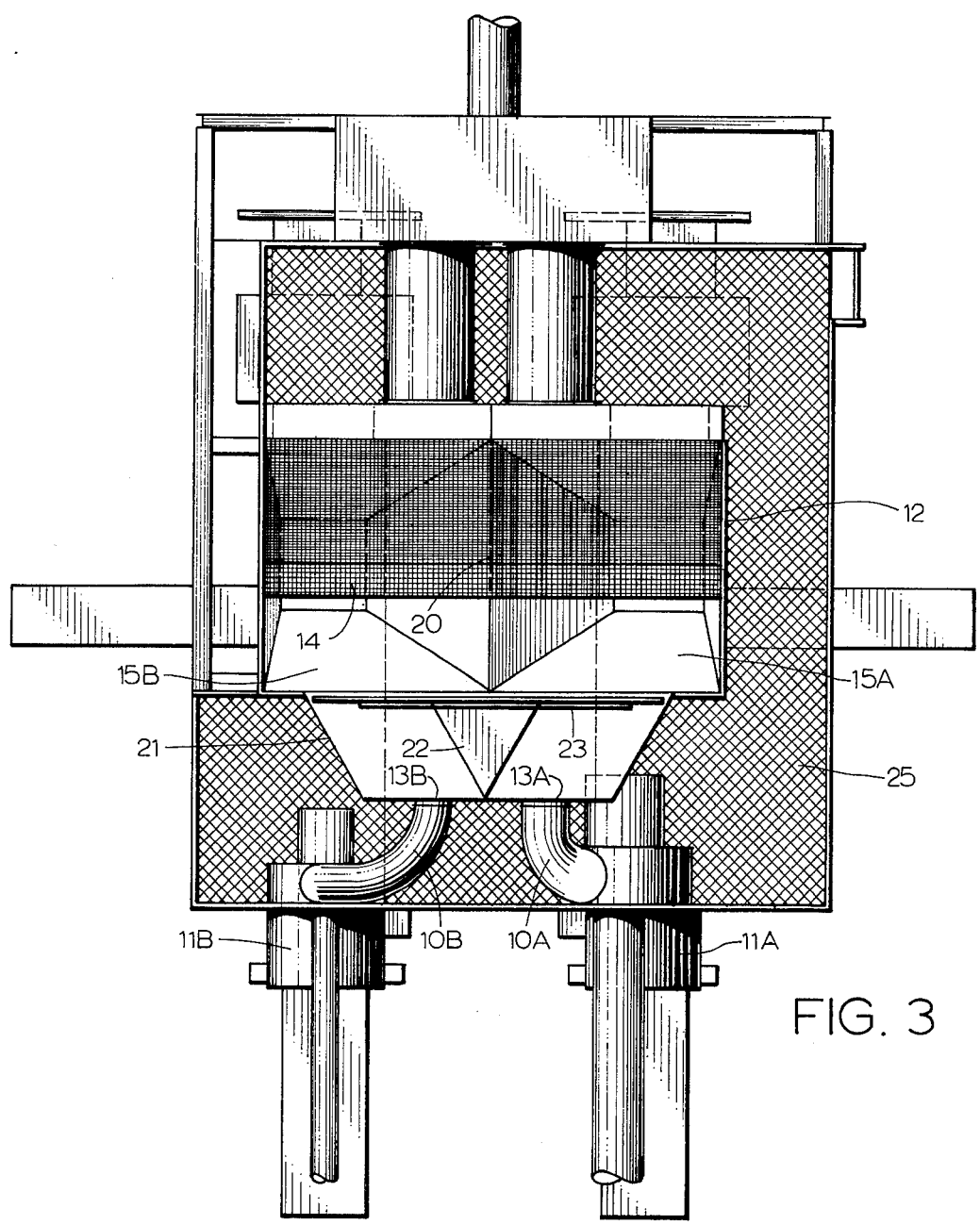
FIG. 3 is a top view of the system illustrated in FIG. 2 with the top of the chamber removed to show some of the detailed inner construction.
Figure 4:
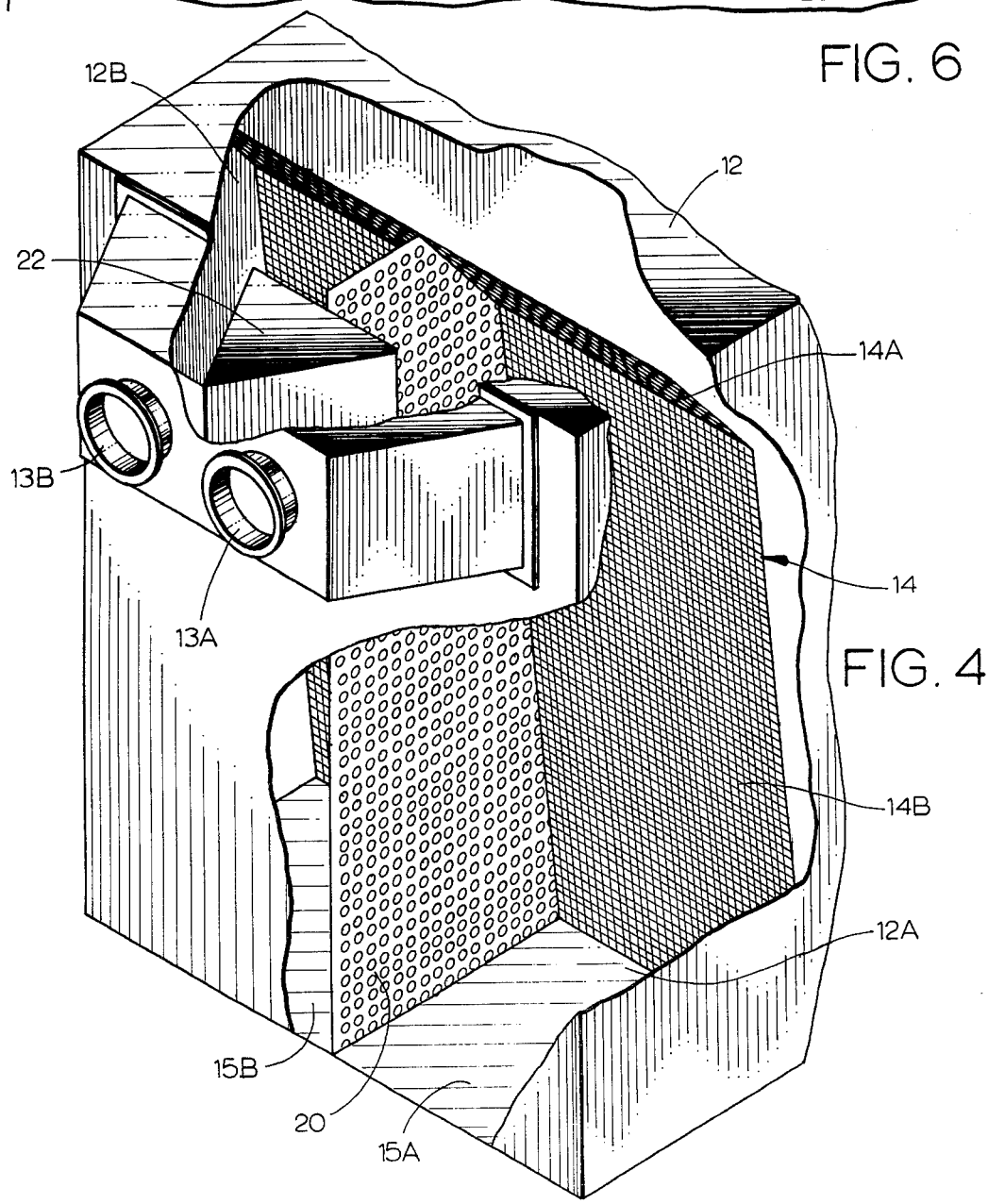
FIG. 4 is a partial tear-away, somewhat diagramatical perspective illustration of a diverter switch utilized in the embodiment illustrated in FIG. 3.

FIG. 4 diagramatically illustrates the construction and operation of the system shown in more structural form in FIGS. 2 and 3. The chamber 12 is separated by a divider 20 into two sections 12A and 12B. A small input housing 21 has separate input openings 13A and 13B respectively associated with corresponding chamber sections 12A and 12B and each is adapted to be connected to a corresponding conduit 10A and 10B. Inside the housing is a diverter switch 22 preferably made of sheet metal triangular in cross section and which can be moved back and forth with relation to the input openings 13A and 13B on tracks 23 (FIG. 6) inside the housing 21. In its central position as illustrated in FIG. 4, the diverter switch is located between the two inputs 13A and 13B so that the entering air with the paper scraps is directed into the corresponding chamber sections 12A and 12B. If the diverter switch 22 is moved leftward, as viewed from the input conduit side in FIG. 4, the air entering both inputs 13A and 13B is directed into the rightmost chamber section 12A and if the diverter switch 22 is moved rightward, then the air entering inputs 13A and 13B is directed to the left section 12B. As mentioned earlier, generally speaking, separate sections of the chamber are provided in order to separate the contaminated from the uncontaminated paper scraps. In an emergency, for example if a baler should shut down, it may be necessary to continue conveying paper scraps away from the assembly line to keep from shutting down the line. The diverter switch provides the means whereby at least temporarily the contaminated and uncontaminated paper scraps will continue to be gathered even though they are mixed together.

Inside chamber 12 deflector screen 14 is angled downward and rearward from the top of the chamber to the top of the hoppers 15A and 15B. The deflector screen 14 is made up of two parts, an upper imperforate part 14A and a lower perforated part 14B. The angle between the upper section 14A and lower section 14B and the location of the screen are such that the air entering the chamber through the openings 13A and 13B generally is deflected downward from the upper portion 14A in a type of washing motion over the lower perforated section 14B. This is to prevent the ribbon-like scraps of paper from being held onto the deflector screen 14B due to the air passing through the screen. The deflector 14B deflects the incoming scrap paper which enters chamber 12 through openings 13A and 13B downward into the mouths of the hoppers 15A and 15B at the bottom of chamber sections 12A and 12B. The divider 20 is also perforated so that the air pressure and air flow in the chamber is generally uniform throughout the interior of chamber 12.

Turning next to FIG. 3, the various elements and their structural and functional relationships are shown in a top view with the cover of the chamber 12 removed. The cross-hatched lines designate the catwalk area 25 around the outside of the chamber 12. The side walls of the hoppers 15A and 15B are shown typically sloping inward and downward from the hopper mouth to the opening which feeds the balers.

Figure 5:
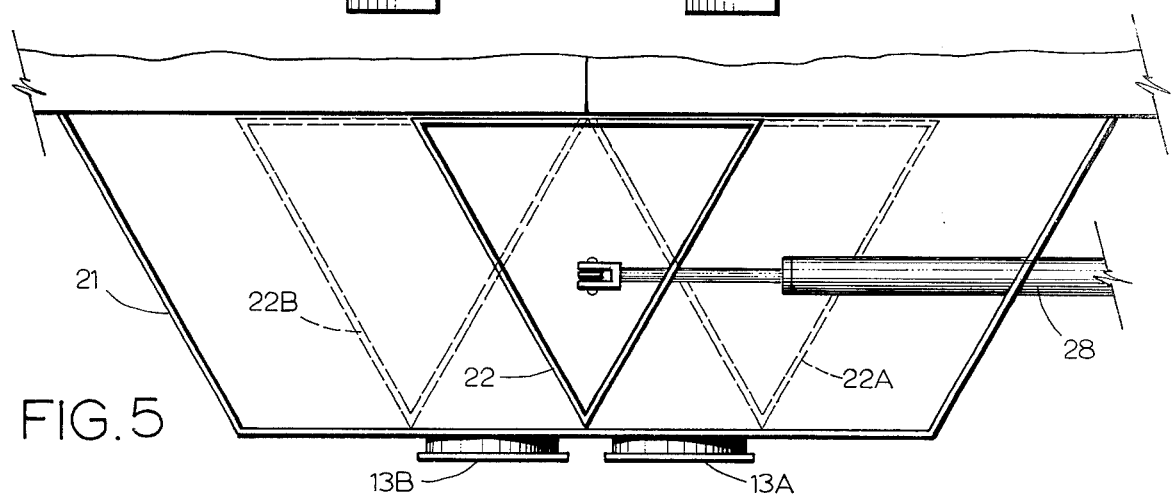
FIG. 5 is a partial top view illustrating the operation of the diverter switch.
Figure 6:
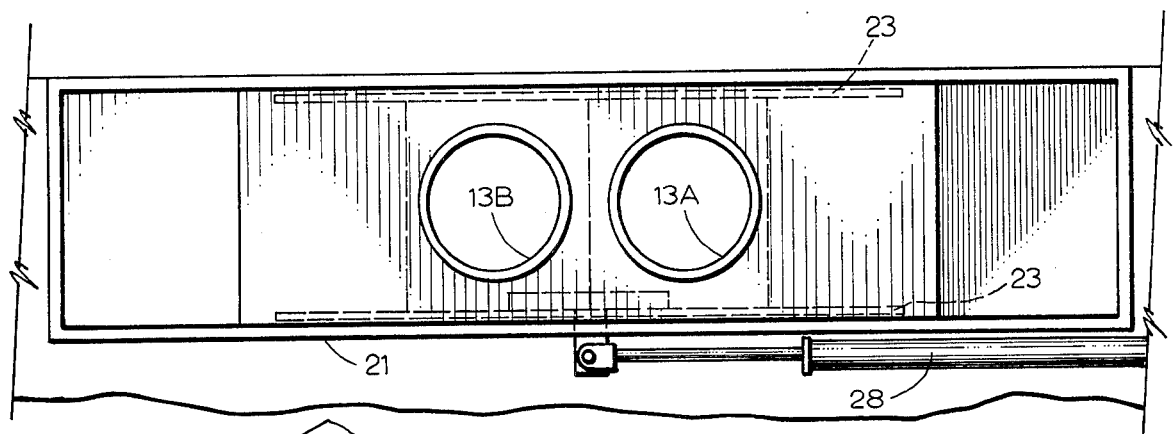
FIG. 6 is an elevational view of FIG. 5.

FIGS. 5 and 6 illustrate in somewhat more detail the construction of the diverter switch mechanism. In FIG. 5 the solid line representation of the diverter 22 shows it in its normal central location and the dotted or shadow lines 22A and 22B show it in its rightmost and leftmost positions respectively. Typically, with no limitation thereto being intended, the diverter 22 might be driven or positioned by a hydraulic cylinder 28 which is suitably mounted to the frame and attached in some convenient fashion to the diverter 22 and operated either electrically or otherwise to position the diverter 22 to its desired location.

Typically, with no limitation intended and only for the purpose of giving some dimensional perspective to the system described which utilizes the teachings of this invention, the chamber 12 may be in the order of about 13 feet wide, about 8 feet high and 3½ feet deep, not including the area for the filter elements. The upper portion 14A of deflector 14 may be about 20 inches from top to bottom and the lower perforated portion 24B about 6½ feet with the perforations being mesh openings of about ¼ inch square. The height of the hopper is in the order of a little over 6 feet with the mouth opening being a little over 6½ feet wide. The conduit typically may range in the order of about 11 inches to about 15 inches in diameter but can vary much greater depending upon the installation, the type of material being conveyed, distances, etc. I claim:

1. Scrap paper salvage system comprising:
   at least two separate conduit means each having an inlet located at a work station for receiving paper scraps and each having a discharge outlet;
   blower means coupled to said conduit means downstream of said inlets for providing air flow for conveying the paper scraps in the conduit means from the inlets to the outlets;
   an enlarged chamber means having divider means for dividing the chamber means into separate paper receiving sections each of said paper receiving sections having separate input openings coupled to a respective one of said conduit means outlets, said chamber divider means being perforated at least in part to allow air but not paper scraps to pass between the chamber sections;
   air output opening means from said chamber means;
   hopper means located at the underside of said chamber means for gathering paper scraps from said chamber means; and
   deflector means located in said chamber means between the chamber input openings and said air output opening means for deflecting received paper scraps to said hopper means while permitting air to pass to the chamber air output opening means.

2. The invention as described in claim 1 wherein said chamber means is of a size such that when the conduit air reaches the chamber input openings its velocity is reduced sufficiently so that it substantially no longer carries the paper scraps.

3. The invention as described in claim 2 further including diverter means located at the inputs to said chamber means for selectively directing the flow of air conveyed paper scraps from said conduit means into said chamber sections.

4. The invention as described in claim 3 wherein said diverter means is slidably mounted in a housing attached to said chamber means.

5. The invention as in claim 4 wherein said diverter means comprises a generally V-shaped imperforate member lying on its side edge with the closed end directed toward the input openings.

* * * * *